(12) United States Patent
Shinoda (10) Patent No.: US 6,173,076 B1
(45) Date of Patent: *Jan. 9, 2001

(54) SPEECH RECOGNITION PATTERN ADAPTATION SYSTEM USING TREE SCHEME

(75) Inventor: Koichi Shinoda, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/595,849

(22) Filed: Feb. 2, 1996

(30) Foreign Application Priority Data

Mar. 2, 1995 (JP) .................................. 7-039073

(51) Int. Cl.$^7$ ..................................... G06K 9/70

(52) U.S. Cl. ................... 382/226; 382/159; 382/228; 704/244; 704/251

(58) Field of Search ................... 382/181, 186, 382/187, 190, 195, 203, 206, 224, 225, 226, 228, 229, 155, 156, 157, 159, 160, 244, 251, 256, 259; 704/244, 251, 256, 259

(56) References Cited

U.S. PATENT DOCUMENTS

| | | | |
|---|---|---|---|
| 4,720,802 | * 1/1988 | Damoukkis | 364/513.5 |
| 4,852,173 | * 7/1989 | Bahl et al. | 382/226 |
| 5,392,363 | * 2/1995 | Fujisaki et al. | 382/228 |

(List continued on next page.)

FOREIGN PATENT DOCUMENTS 6-348292  12/1994  (JP) ............... G01L/3/00

OTHER PUBLICATIONS

A Voice Recognition System, Takao Watanabe, Japanese Patent 06348292 Translation.*

Furui, "Speaker Adaption Techniques in Speech Recognition", Televsion Study Association, vol. 43, No. 9, pp. 929–934, (1989).

Nakagawa, "Speech Recognition With Probability Models", Electronic Information Communication Engineer's Assocation, pp. 40–44, 55–60 and 69–74, (1987).

Digalakis et al., "Fast Speaker Adaption Using Constrained Estimation of Gaussian Mixtures", SRI International Speech Technology and Research Laboratory, pp. 94–98, (1995).

Kosaka et al. "Speaker–independent speech recognition based on tree–structured speaker clustering" Computer Speech and Language, vol. 10, No. 1, Jan. 1996, UK, pp. 55–74, XP002049794 *paragraph 2.4—paragraph 2.4—paragraph 2.5*.

Kosaka et al. "Tree–structered speaker clustering for speaker–independent continuous speech recognition" Proceedings of International Conference on Spoken Language Processing (ICSLP '94), vol. 3, Sep. 18–22 1994, Yokohama, JP, pp. 1375–1378, XP002049795 *p. 1375.

(List continued on next page.)

Primary Examiner—Matthew C. Bella
(74) Attorney, Agent, or Firm—Foley & Lardner (57) ABSTRACT

Pattern matching means 3 matches categories of a reference pattern stored in reference pattern memory means 2 and input samples of an input pattern produced by input pattern generating means 1. Data statistics estimating means 6 calculates the numbers of input samples in individual nodes of a tree scheme reference pattern stored in the tree scheme reference pattern memory means 4. Node selecting means 6 selects nodes used for adaptation according to the input sample numbers calculated by the data statistics estimating means 5. Adaptation parameter generating means 7 calculates an adaptation parameter in the Nodes selected by the node selecting means 6. Reference pattern generating means 8 produces an adapted reference pattern using the calculated adaptation parameter.

20 Claims, 4 Drawing Sheets

U.S. PATENT DOCUMENTS

| | | | |
|---|---|---|---|
| 5,450,522 | * | 9/1995 | Hermansky et al. .................. 395/2.8 |
| 5,579,436 | * | 11/1996 | Chou et al. ........................... 704/244 |
| 5,608,841 | * | 3/1997 | Isuboka ................................ 395/265 |
| 5,621,809 | * | 4/1997 | Bellegarda et al. ................. 382/228 |
| 5,625,748 | * | 4/1997 | McDonough et al. .............. 704/251 |
| 5,625,749 | * | 4/1997 | Goldenthal et al. ................ 395/2.63 |
| 5,644,652 | * | 7/1997 | Bellegarda et al. ................. 382/228 |
| 5,649,023 | * | 7/1997 | Barbara et al. ...................... 382/226 |
| 5,661,820 | * | 8/1997 | Kegelmeyer, Jr. .................. 382/226 |
| 5,715,367 | * | 2/1998 | Gillick et al. ....................... 395/2.63 |

OTHER PUBLICATIONS

Kosaka et al. "Tree–structured speaker clustering for fast speaker adaptation" Proceedings of International Conference on Acoustics, Speech and Signal Processing (ICASSP) '94), vol. 1, Apr. 19–22, 1994, Adelaide, SA, AU, pp. 245–248, XP002049796 *paragraph 3.4—paragraph 5*.

* cited by examiner

SPEECH RECOGNITION PATTERN ADAPTATION SYSTEM USING TREE SCHEME

BACKGROUND OF THE INVENTION

The present invention relates to a pattern recognition system and, more particularly, to a pattern adaptation system for adapting "a reference pattern" constituting a plurality of different categories using "an input pattern" as an aggregate of input samples. It is presently understood that the best field of utilization of the present invention is the speaker adaptation system in a speech recognition system. This system is based on a Hidden Marcov model (HMM) of a mixed continuous distribution model type or the like in which the reference pattern output probability distribution is a mixed Gaussian distribution.

Recently, research and investigations concerning mechanical recognition of speech patterns have been made, and various methods (i.e., speech recognition methods) have been proposed. One typical method that is extensively applied is based on a method called dynamic programming (DP) matching.

Particularly, in the field of speech recognition systems using HMM, speaker-independent speech recognition systems that are capable of recognition of the speech of any person, have recently been extensively studied and developed.

The speaker-independent type of recognition system has an advantage over the speaker-dependent type of recognition system, where the speaker-dependent type is used by a definite user, because the user of a speaker-independent type need not register any speech in advance. However, the following problems in the speaker-independent recognition system are pointed out. A first problem is that the speaker-independent system is inferior to the speaker-dependent system for almost all speakers. A second problem is that the speaker-independent recognition performance is greatly deteriorated for some "particular speakers" (i.e., unique speakers).

In order to solve these problems, research and investigations have recently been started, which concern the application of the speaker adaptation techniques that are used mainly in speaker-dependent systems to speaker-independent systems as well. The speaker adaptation techniques have a concept of adapting a speech recognition system to new users (i.e., unknown speakers) by using a lesser amount of adaptation data than is used for the initial training. The speaker adaptation techniques are detailed in Sadaoki Furui, "Speaker Adaptation Techniques in Speech Recognition", Television Study Association, Vol. 43, No. 9, 1989, pp. 929–934.

Speaker adaptation can be classified into two methods. One is "supervised speaker adaptation," and the other is "unsupervised speaker adaptation." Also, it is understood that the "supervised signal" is a vocal sound expression series representing the speech contents of input speech. The "supervised speaker adaptation" thus refers to an adaptation method in the case where the vocal sound expression series for the input speech is unknown, and requires preliminary instruction of speech vocabularies with the unknown speaker for adaptation. The "unsupervised adaptation," on the other hand, is an adaptation method used when the vocal sound expression series for the input speech is known, and requires no limit on the speech contents of input speech to the unknown speaker, i.e., no speech vocabulary has to be instructed with the unknown speaker. Actually, unsupervised adaptation using input speech as the subject of speech recognition can occur without the unknown speaker being aware that the adaptation is being done. Generally, however, the recognition rate based on "unsupervised adaptation" after the adaptation is low as compared to that based on the "supervised adaptation." For this reason, the "supervised adaptation" is presently used frequently.

From the above viewpoint, the need for the speaker adaptation system in the speech recognition system is increasing. The "adaptation" techniques as described are important not only in speech recognition systems but also in pattern recognition systems, the concept of which involves the speech recognition system. The "speaker adaptation system" in the speech recognition system can be generalized as the "pattern adaptation system" in the pattern recognition system.

In the prior art pattern adaptation systems of the type as described, adaptation is executed in the same mode irrespective of whether the number of input samples for adaptation is large or small. Therefore, when the input samples are less in number, then the data amount may be insufficient and deteriorate the accuracy of parameter estimation for the pattern adaptation.

The process of the speech recognition system, which are the most extensive applications of the present invention, will now be described. A speech recognition system using HMM is described as an example, and the speaker adaptation techniques in this speech recognition system will also be mentioned with reference to FIG. 4.

Figure 4:
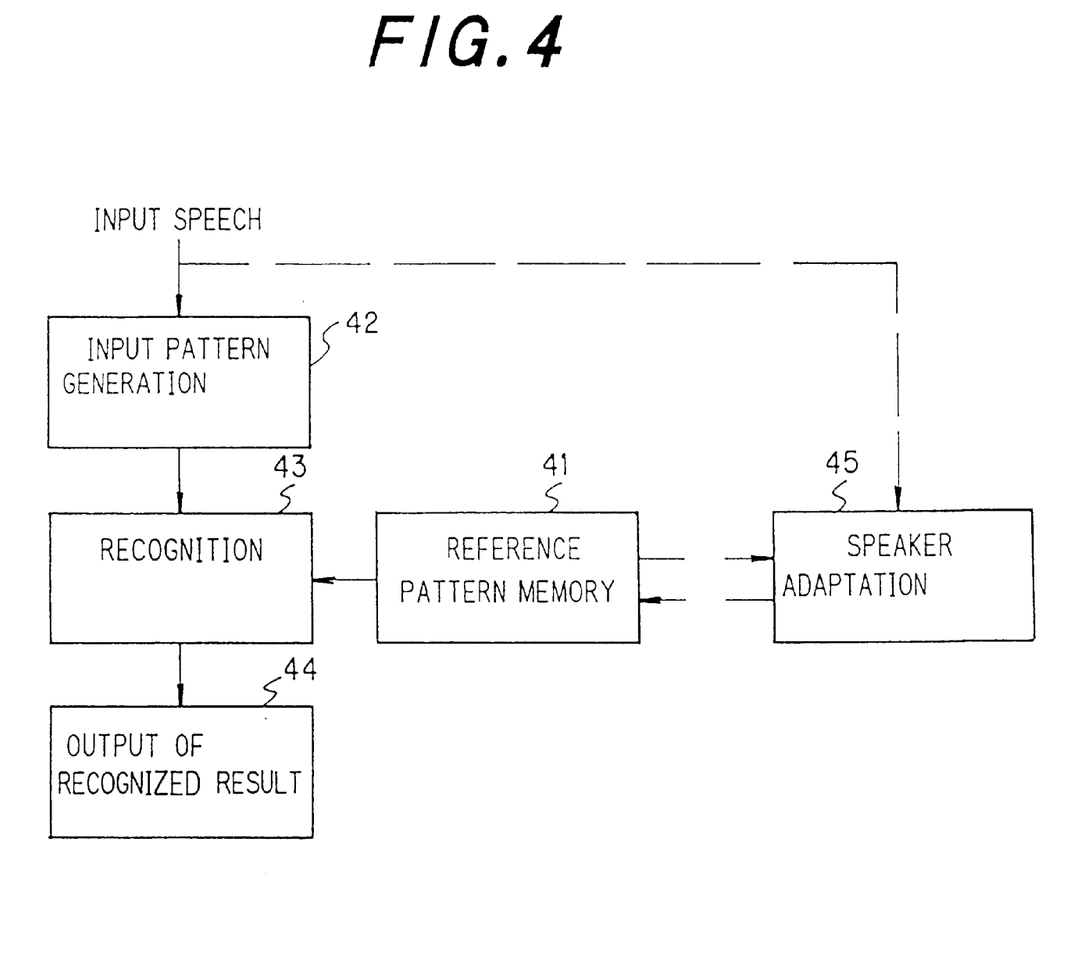
FIG. 4 is a block diagram of a pattern adaptation system using a tree scheme.

A speaker's speech (i.e., input speech) is supplied to an input pattern generation device 42 for conversion to a feature vector time series for each unit, also called a "frame," having a certain time length through such processes as analog-to-digital conversion and speech analysis. The "feature vector time series" is referred to as an input pattern. The time length of the frame is usually 10 to 100 ms. The feature vectors are obtained by extracting the feature quantity of the speech spectrum at corresponding instants, usually 10-dimensional to 100-dimensional (10-d to 100-d).

HMM's are stored as reference patterns in a reference pattern memory, device 41. The HMM's are speech (sound) information source models, and the HMM parameters may be trained by using input speech. The HMM's will be mentioned in the description of a recognition device 43 given hereunder. The HMM is usually prepared for each recognition unit. Here, the case of where the recognition unit is a sound element is taken as an example. In the speaker-independent recognition system, HMM's are stored in the recognition pattern memory device 41 where the HMM's have been previously obtained for use with an unknown speaker through training of speeches of many speakers.

A case is now assumed, where 1,000 words are the subjects of recognition, that is, a case where a correct answer of one word is obtained among a set of recognition candidates of 1,000 words. For word recognition, HMMs of individual sound elements are coupled together to produce an HMM of a recognition candidate word (word HMM). When 1,000 words are recognized, word HMMs for 1,000 words are produced.

The recognition device 43 recognizes the input pattern using the word HMMs. This "pattern recognition" will now be described. In the HMM, a statistical concept is introduced into the description of the reference pattern to cope with variations of the speech pattern. The HMM is detailed in Seiichi Nakagawa, "Speech Recognition with Probability Models", the Electronic Information Communication Engineer's Association, 1987 (hereinafter referred to as the Nakagawa Literature), pp. 40–44, 55–60 and 69–74.

Each sound element HMM usually comprises 1 to 10 states and inter-state transitions. Usually, the start (i.e., first) and last states are defined, and a symbol is taken out from each state for every unit time for inter-state transition. The speech of each sound element is expressed as a time series of symbols produced from individual states during the inter-state transition interval from the start state to the last state. For each state the symbol appearance probability (output probability) is defined, and for each inter-state transition the transition probability is defined. The HMM thus has an output probability parameter and a transition probability parameter. The output probability parameter represents a "sound color" sway of the speech pattern. The transition probability parameter represents a "time-wise" sway of the speech pattern. The generation probability of speech from the model (i.e., HMM) thereof, can be obtained by setting the start state probability to a certain value and multiplying the value by the output probability and also by the transition probability for each inter-state transition.

Conversely, when a speech element is observed, its generation probability can be calculated by assuming that it is generated from a certain HMM.

In the HMM speech recognition, an HMM is prepared for each recognition candidate, and upon the input of speech the generation probability thereof is obtained in each HMM. The maximum generation probability HMM is determined to be a source of generation, and the recognition candidate corresponding to that HMM is made to be the result of recognition.

The output probability parameter is expressed by a discrete probability distribution expression and a continuous probability distribution expression. Here, the case of where the continuous probability distribution expression is adopted is taken as an example. The continuous probability distribution expression uses a mixed continuous distribution, i.e., a distribution obtained by adding together a plurality of Gaussian distributions with weighting.

The output probability parameter, the transition probability parameter, and such parameters as the weighting of a plurality of Gaussian distributions, are preliminarily given a training speech with respect to a model and trained with an algorithm called the Baum-Welch algorithm. The Baum-Welch algorithm is detailed in the Nakagawa Literature.

The process of the word recognition of the input pattern will now be described mathematically. Input pattern X which is expressed as a time series of feature vectors is given as $$X = x_1, x_2, \ldots, x_t, \ldots, x_T \qquad (1)$$

wherein T represents a total number of input patterns x.

Recognition candidate words are denoted by $W_1, W_2, \ldots, W_n, \ldots, W_N$. The total number of recognition candidate words is denoted by N. Matching between the word HMM of each word $W_n$ and the input pattern X is made as follows, with the subscripts omitted unless they are needed for clarity. In the word HMM, the transition probability from state j to state i is denoted by $\alpha_{ji}$, the mixture weight of the output probability distribution by $\lambda_{im}$, each element Gaussian distribution mean vector in the output probability distribution by $\mu_{im}$, and the covariance matrix of the output probability distribution by $\Sigma_{im}$. Also, t denotes the instant of input, i and j denote the states of the HMM, and m denotes the mixed element serial number.

The following recurrence formula calculation concerning forward probability a(i, t) is expressed.

$$\alpha(i, 0) = \pi \qquad (2)$$

$i = 1, \ldots, I$ $$\alpha(i, t) = \Sigma \alpha(j, t-1) a_{ji} b_i(x_t) \qquad (3)$$

$i = 1, \ldots, I; t = 1 \ldots, T$ wherein $\pi_i$ represents a probability with initial state i, and $b_i(x_t)$ and $N(x_t; \mu_{im}, \Sigma_{im})$ are represented by the following formulae:

$$b_i(x_t) = \Sigma_m \lambda_{im} N(x_t); \mu_{im}, \Sigma_{im}) \qquad (4)$$

$$N(x_t); \mu_{im}, \Sigma_{im}) = (2\pi)^{-n/2} |\Sigma_{im}|^{-\frac{1}{2}}$$

$$\exp(-(\mu_{im} - x_t) \Sigma_{im}^{-i} (\mu_{im} - x_t)/2) \qquad (5)$$

The likelihood $P^n(X)$ for the input pattern $W_n$ is obtainable as:

$$P^n(X) = \alpha(I, T) \qquad (6)$$

wherein I represents a final state. Through execution of this processing for the word HMM of each word, a recognized word $W_n$ is given as:

$$\hat{n} = \text{argmax}_n P^n(X) \qquad (7)$$

Such recognition result words are supplied from the recognition device 43 to the recognition result output (i.e., output of recognized result) device 44.

A recognition result output device 44 executes, for example, such processes as outputting recognition result words to a display and sending control commands corresponding to recognition result words to different systems or apparatuses. These displays, systems and apparatuses examples ate omitted from the drawings for clarity.

In the speaker adaptation by a speaker adaptation device 45 (see the broken lines with arrows in FIG. 4), the reference pattern in the reference pattern memory device 41 is corrected to provide improvement of the performance with respect to unknown speakers. Specifically, training, using the speaker's speech when the speech recognition system is used, is allowed for the adaptation of the reference pattern to the speaker, thus providing a high recognition rate. In this case, the adaptation process is not changed in dependence on whether the data amount input speech (i.e., number of input samples) are great or less, (i.e., larger or smaller) and a certain number of input samples are necessary for adequate speaker adaptation.

In the prior art pattern adaptation system described above, with a lesser number of input samples the accuracy of the parameter estimation for the pattern adaptation is deteriorated. This deterioration is due to the insufficient data amount, resulting in insufficient effect of the reference pattern adaptation.

For example, in the speaker adaptation system in the speech recognition system, in the case of a very small amount of input speech data, the parameter estimation accuracy is deteriorated due to the insufficient data amount. The result of this insufficient amount is that an adequate effect of the speaker adaptation of the reference pattern cannot be obtained, that is, the recognition performance is not improved.

SUMMARY OF THE INVENTION

In the light of the above circumstances, it is an object of the present invention to provide a pattern adaptation system with a tree scheme, in which the concept of the reference pattern tree scheme is introduced to determine a tree scheme hierarchical layer as the subject of adaptation according to the data amount (i.e., number of input samples), thus preventing the parameter estimation accuracy deterioration in a case of insufficient data amount and permitting fine reference pattern updating (production of an adapted reference pattern) according to the data amount.

In the pattern adaptation system with a tree scheme according to the present invention, for adapting a reference pattern constituted by a plurality of different categories by using an input pattern as an aggregate of input samples, the input pattern generating device produces the input pattern. The reference pattern memory device stores the reference pattern. The pattern matching device matches the categories of the reference pattern stored in the reference pattern memory device with input samples of the input pattern produced by the input pattern generating device. The tree scheme reference pattern memory device previously stores the tree scheme reference pattern which is a reference pattern expressed in a tree scheme. The data amount estimating device calculates the number of input samples in each node of the tree scheme reference pattern in the tree scheme reference pattern memory device. The node selecting device selects the node used for the adaptation according to the input sample number calculated by the data amount estimating device. The adaptation parameter generating device calculates (i.e., produces) an adaptation parameter in the node selected by the node selecting device. The reference pattern generating device produces an adapted reference pattern by using the adaptation parameter produced by the adaptation parameter generating device and updates the reference pattern.

Other objects and features will be clarified from the following description with reference to attached drawings.

DETAILED DESCRIPTION OF THE PREFERRED EMBODIMENTS

The present invention will now be described in detail in conjunction with an embodiment thereof and with reference to the drawings.

Figure 1:
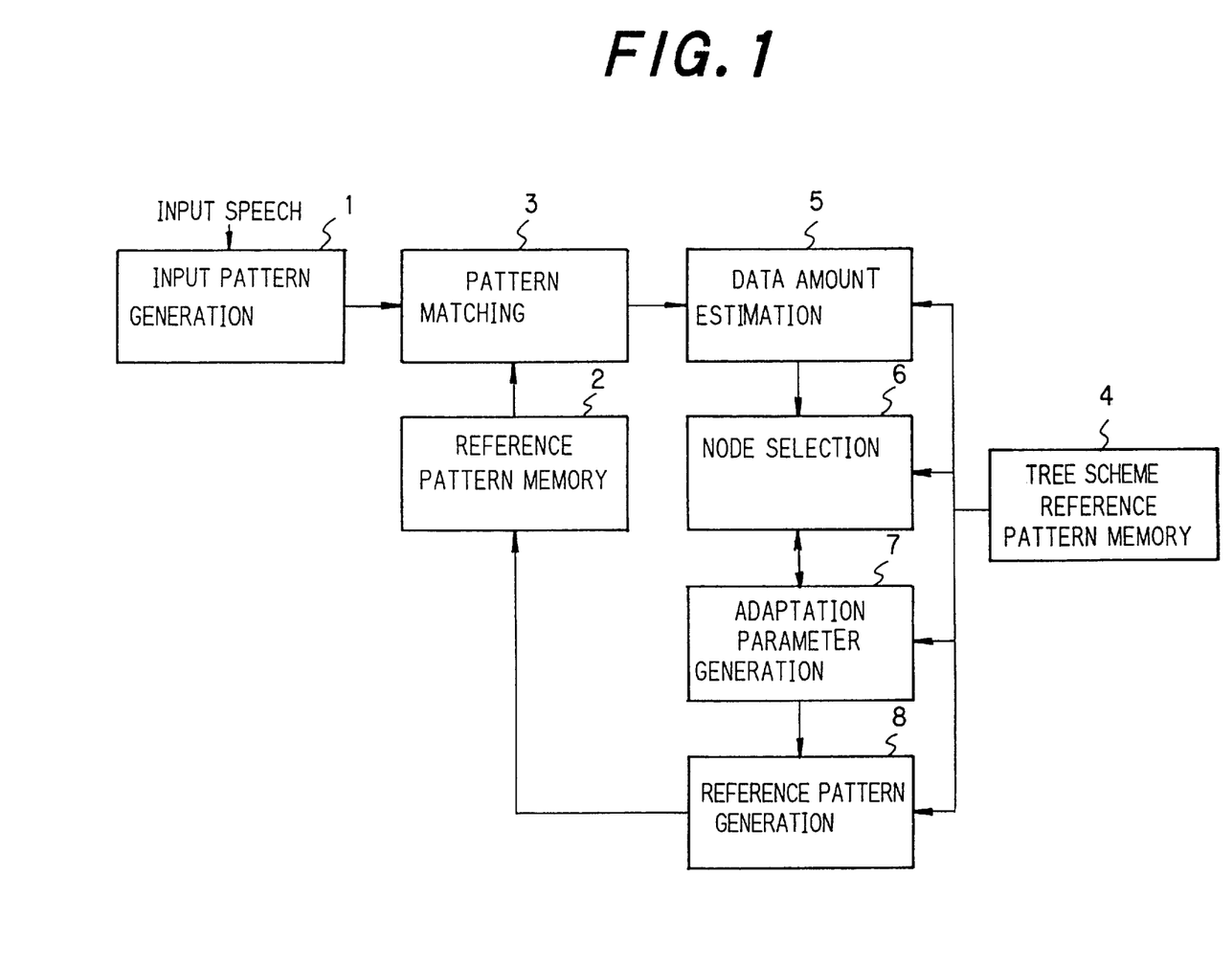
FIG. 1 is a block diagram showing an embodiment of the present invention applied to a pattern adaptation system using a tree scheme.

FIG. 1 is a block diagram showing an embodiment of the present invention applied to a pattern adaptation system using a tree scheme. This embodiment of the pattern adaptation system using a tree scheme corresponds to the "speaker adaptation system (i.e., device) 45" in the speech recognition system at FIG. 4.

The speaker adaptation system, using the tree scheme embodying the present invention, comprises an input pattern generating (i.e., generation) device 1, a reference pattern memory device 2, a pattern matching device 3, a tree scheme reference pattern memory device 4, a data amount estimating (i.e., estimation) device 5, a node selecting (i.e., selection) device 6, an adaptation parameter generating (i.e., generation) device, and a reference pattern generating (i.e., generation) device 8.

Figure 2:
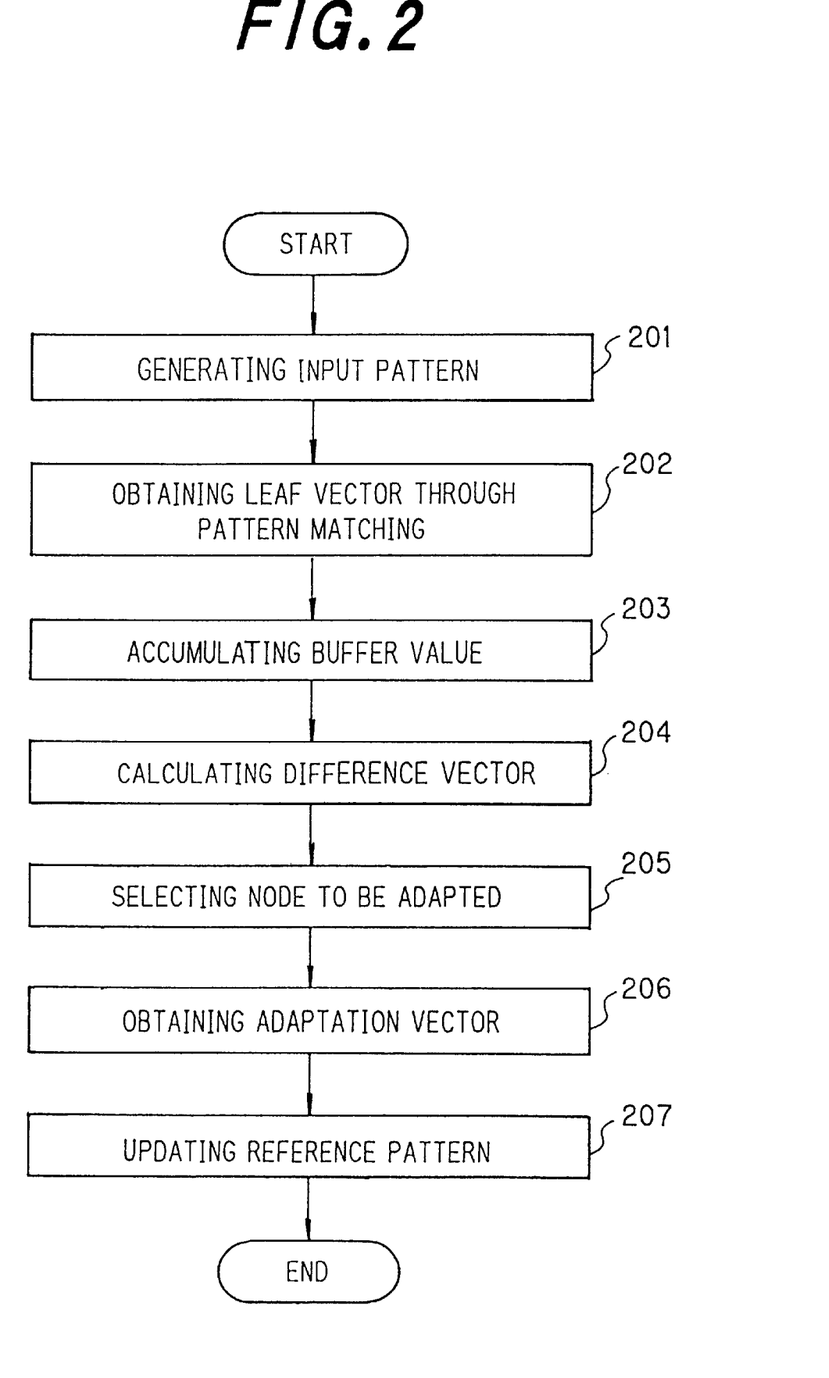
FIG. 2 is a flow chart illustrating the process of the embodiment of the pattern adaptation system using the tree scheme.

FIG. 2 is a flow chart illustrating an example of the process of the embodiment of the pattern adaptation system using the tree scheme (i.e., the process used in adaptation). The process in FIG. 2 can be summarized as comprising an input pattern generation step 201, a pattern matching step 202, a buffer value accumulation step 203, a difference vector calculation step 204, a node selection step 205, an adaptation vector calculation step 206, and a reference pattern updating step 207.

Figure 3:
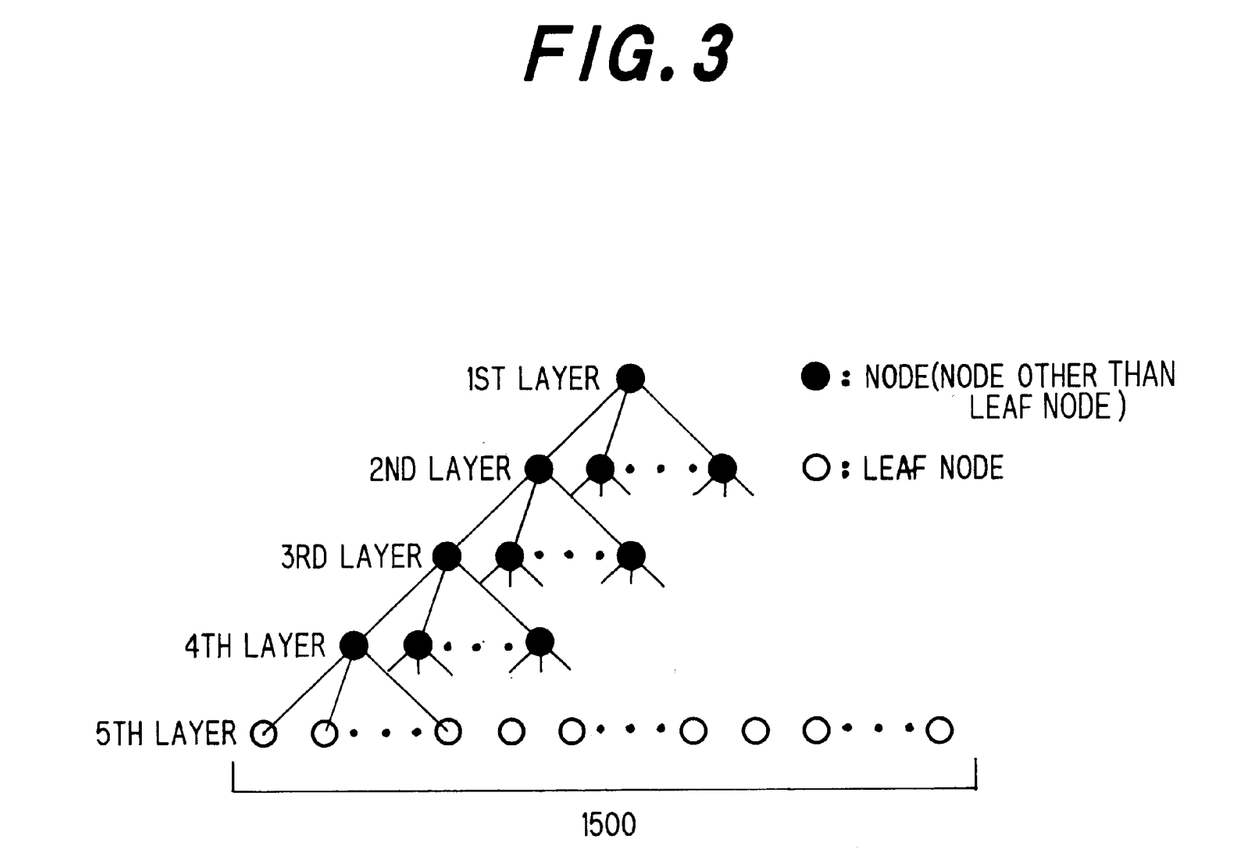
FIG. 3 is a view showing an example of a tree scheme reference pattern used in the embodiment of the pattern adaptation system using the tree scheme.

FIG. 3 is a view showing an example of a tree scheme reference pattern used in the embodiment of the pattern adaptation system using the tree scheme (i.e., a reference pattern expressed as a tree scheme in the tree scheme reference pattern memory device 4 of FIG. 1).

The operation of the pattern adaptation system using the tree scheme will now be described.

In this embodiment, and generally according to the present invention, the words or sentences to be spoken for the speaker adaptation are preliminarily instructed (e.g., provided) to the user, and HMM parameters are updated (adapted) by using the word expression and input speech. This adaptation belongs to the category of "supervised adaptation" noted above in the sense that the "correct" words of speech are known beforehand.

The data amount (i.e., number of input samples) should be made as small as possible in order to alleviate the speaker's burden. However, the number of HMM parameters is generally large, and if all the parameters are to be adapted with only a small amount of input speech for adaptation, the data amount may be insufficient, deteriorating the accuracy of parameter estimation and recognition performance. In this embodiment, from among the HMM parameters the mean vectors of output probability distribution are selected as a parameter to be adopted. The mean vectors are selected as the adaptation subject parameter in that they are thought to have the greatest influence among the HMM parameters on the recognition performance.

The operation of the embodiment of the pattern adaptation system using the tree scheme will now be described. The operation will be described in succession as (1) the preamble operation to the adaptation, and (2) the adaptation operation.

(1) Preamble Operation to the Adaptation:

Firstly, a reference pattern that is stored in the reference pattern memory device 2 will be described. As the reference pattern, an initial HMM is prepared. The initial HMM may, for example, be an indefinite speaker's speech element HMM which has been prepared in advance from speeches of many speakers. Such initial HMM is stored in the reference pattern memory device 2.

Secondly, a tree scheme reference pattern that is stored in the tree scheme pattern memory device 4 will be described. A tree scheme of the reference pattern (tree scheme reference pattern) is produced in advance from the reference pattern stored in the reference pattern memory device 2. Here, the aggregate of all the states of the mean vectors in the initial HMM are considered, and an N-layer tree scheme of the mean vector group is produced. Specifically, the distance between mean vectors is defined, and the mean vectors corresponding to the individual states are clustered according to the definition. In this operation, nodes representing the mean vectors corresponding to the individual states (corresponding to leaf nodes) and upper layer nodes based on the clustering are produced. A tree scheme having these nodes is thus produced (see FIG. 3).

A method of producing a tree scheme concerning Gaussian distribution is detailed in Japanese Patent Laid-Open Publication No. Heisei 6-348292 by Watanabe Takao, entitled, "Voice Recognition System" (hereinafter referred to as the Takao Literature).

FIG. 3 shows an example of such tree scheme reference pattern. In this tree scheme reference pattern, N is 5 and the total number of distributed subjects is 1,500. The mean vectors shown by the nodes (leaf nodes) in the lowermost layer (i.e., N-th, here 5th, layer) individually correspond to the respective states of the HMM; and they are referred to as leaf vectors. The vectors shown by the nodes in the intermediate (i.e., 1st to (N−1)th, here 1st to 4th, tree scheme layers are referred to as node vectors. Such a tree scheme reference pattern is stored in the tree scheme reference pattern memory device 4.

Thirdly, buffers which are prepared for the process in the data statistics estimating device 4 (i.e., buffers used for estimating the data amount of the number of input samples) will be described.

A buffer A(n, m) with the dimensions of feature vectors and a uni-dimensional buffer B(n, m) for adding the feature vectors are prepared. Here, n represents the hierarchical layer order number (i.e., n-th order) in the tree scheme, and m represents the order number of node in the n-th layer. The buffers A and B accumulate data necessary for the updating mean vector for every input sound (i.e., every sound of input speech). These buffers A and B are controlled by the data amount estimating device 5.

As will be described later, the contents in the buffers A and B are updated for every input speech. When a series of "input speeches" (i.e., input samples) for adaptation have been inputted, the reference pattern stored in the reference pattern memory device 2 is updated (i.e., adapted) by using the contents in the buffers A and B.

(2) Adaptation Operation:

In the adaptation of the reference pattern parameter (i.e., HMM state mean vectors in this embodiment), the following process is executed for every input sound (see FIG. 2).

First, like the recognition process for which a description in connection to FIG. 4 is to be referred to, the input pattern generating device 1 generates an input pattern from the input speeches of each input speech (step 201).

Secondly, the pattern matching device 3 executes pattern matching (i.e., derivation of the correspondence relation between the categories of the reference pattern and the input samples of the input pattern) through the following processes (1) to (3), thus obtaining leaf vectors corresponding to feature vectors at each instant (step 202).

(1) Using correct word expressions, word HMMs corresponding to the input pattern are produced by coupling together initial HMMs of the individual sound elements. Then, pattern matching between the input pattern and the word HMMs is executed. In this operation, the leaf vectors in the tree scheme reference pattern are used as the individual state mean vectors.

In this pattern matching, recurrence formulae based on the following Equations 8 to 11 are used in lieu of Equations 2, 3, 4 and 6 in the recurrence formulae of Equations 2 to 7 noted before.

$$\Phi(i, 0)=\pi i \quad i=1, \ldots, I \tag{8}$$

$$\Phi(i, t)=\max_j \Phi(j, t-1)_{ji} b_i(x) \tag{9}$$

$$i=1, \ldots, I; t=1, \ldots, T$$

$$bi(x_t)=\max_m \lambda_{im} b\lambda_{im}(x_t) \tag{10}$$

$$i=1, \ldots, I; t=1, \ldots, T; m=1, \ldots, M$$

$$P_N(X)=\Phi(I, T) \tag{11}$$

The method using these formulae is called a Viterbi algorithm. Here, M is the number of distributed subjects in each state, and $b_{im}(x_t)$ is the appearance probability $N(x_t; \mu_{im}, \Sigma_{im})$ of distribution corresponding to the m-th leaf vector in state i. The distribution order numbers are provided such that they do not overlap in all the states.

(2) Concurrently with the calculation on Equation 9 to derive $\Phi(i, t)$ noted above, calculation of $$\Psi_1(i, t)=\text{argmax}_j \Phi(j, t-1) a_{ji} b_i(x_t) \tag{12}$$

$$i=1, \ldots, I; t=1, \ldots, T$$

$$\Psi_2(i, t)=\text{argmax}_m \lambda_{(im)} b_{im}(x_t) \tag{13}$$

$i=1, \ldots, I; t=1, \ldots, T$ is executed, and the states at an instant preceding each instant are stored in an array $\Psi_1$, while storing the distribution order numbers giving the maximum appearance probabilities in an array $\Psi_2$.

(3) After completion of the calculation on Equation 11 noted above for the last frame T, the mean vectors corresponding to the individual frames are obtained successively from the last to the first frame by using the arrays $\Psi_1$ and $\Psi_2$. Specifically, state number S(t) corresponding to frame t and leaf vector number R(t) are obtained from the following Equations $$S(T)=I \tag{14}$$

$$S(t)=\Psi_1, (S(t+1), t+1) \tag{15}$$

$$t=1, \ldots, T-1$$

$$R(t)=\Psi_2(R(t), t) \tag{16}$$

$$t=1, \ldots, T-1$$

This process is referred to as back-tracking. Through this process, the leaf vectors corresponding to feature vectors at individual instants are obtained.

Thirdly, the data amount estimating device 5 estimates (i.e., calculates) the number of input samples (i.e., data amount of input speech) by accumulating the contents in the buffers A and B corresponding to the individual nodes (step 204).

Specifically, the estimating device 5 executes a process of obtaining $$A(N, R(t))=A(N, R(t))+(x_t-\mu_m^N) \tag{17}$$

$$B(N, R(t))=B(N, R(t))+1 \tag{18}$$

for each feature vector $x_t$ at each instant, and adds together the contents in the buffers A and B corresponding to the leaf nodes. In Equation 17, $\mu_m^n$ represents the mean vector of the m-th node in the n-th layer. Likewise, for the nodes which have the leaf vectors R(t) as sub-nodes, the contents in the buffers A and B are added together as $$A(n, m)=A(n, m)+\sigma(m, j_n(R(t))(x_t-\mu_m^n) \tag{19}$$

$$n=1, \ldots, N-1$$

$$B(n, m)=B(n, m)+\sigma(m, j_n(R(t))1 \tag{20}$$

$$n=1, \ldots, N-1$$

where $j_n(m)$ represents the serial numbers of the n-th layer nodes having leaf node m (i.e., m-th leaf node) as sub-nodes, and $\sigma(i,j)$ is given as $$\sigma(i, j)+1 \text{ if } i=j \qquad (21)$$

$$=0 \text{ if } i \neq j \qquad (22)$$

This process is executed repeatedly a number of times corresponding to the number of speech words to be adapted. In this way, the number of input samples (i.e., data amount of input speech) is calculated.

In a fourth process after the process on the input speeches to be adapted, the adaptation parameter generating device 7 obtains difference vectors D for all the tree scheme reference pattern nodes as (step 204)

$$D(n, m)=A(n, m)/B(n, m) \qquad (23)$$

When the data amount of the input speech (i.e., the number of input samples) are small, the number of input frames corresponding to the individual leaf nodes is very small. In such a case, the parameter estimation with a small number of input samples may deteriorate the recognition performance. Accordingly, it is suitable to provide a threshold value T for the content in the buffer B representing the number of input samples and adopt adaptation vectors $\Delta(m)$ corresponding to n'-th node given by the following equation in lieu of the adaptation vectors $\Delta(m)$ of the leaf vector in the lead node m. In other words, as adaptation vector $\Delta(m)$ is used the difference vector in the n'-th node, in which a relation $$B(n', m)>TB$$

is met for the first time as during the operation executed for the successive nodes from lower to higher layer ones.

$$n'=\text{argmax}_n B(n, (j_n(m))) (B(n, (j(m)<TB)$$

$$n=1, \ldots, N \qquad (24)$$

$$\Delta(m)=D(n', j_n'(m)) \qquad (25)$$

In a fifth process, the node selecting device 6 calculates n' in Equation 24 and selects node (n'-th layer node) to be adapted (i.e., used for the adaptation).

In a sixth process, the adaptation parameter generating device 7 obtains adaptation vectors $\Delta(m)$ using Equation 25 according to the no selection by the node selecting device 6 (step 206).

Through the above fifth and sixth processes, it is possible to estimate the adaptation vectors in a lesser data distribution situation from a certain data amount. The upper layer node difference vector is obtained by averaging the lower layer node difference vectors and are thought to represent broader view changes in the vector space. Thus, in a lesser data situation or in a distribution situation without corresponding data, difference vectors representing broader view changes are used for adequate adaptation.

Data amount increase of the input speech increases the data amount in each node. In this case, lower layer node difference vectors are used to obtain a broader view, finer adaptation in the vector space.

As the method of adaptation vector production, in addition to the above method of "selecting a node and making the difference vector of that node to be an adaptation vector", the following methods (1) and (2) are conceivable.

(1) Method in which adaptation vectors of a plurality of upper and lower layer nodes are weighted for use.

In this method, the adaptation vector $\Delta(m)$ is given as follows.

$$\Delta(m) = \sum_{n=1}^{N} w(n) D(n, j_n(m)) \qquad (26)$$

where W(n) is an adequate weight for the n-th layer nodes. It is possible to let information of data statistics of the individual layers on adaptation vectors as follows.

$$\Delta(m) = \frac{\sum_{n=1}^{N} B(n, (j_n(m))) w(n) D(n, j_n(m))}{\sum_{n=1}^{N} w(n) B(n) j_n(m))} \qquad (27)$$

(2) Method in which the hierarchical layer with the adaptation vectors to be used is selected according to the input data amount for all the mean vectors.

In this method, the adaptation vector $\Delta(m)$ is obtained as follows.

$$n'=\text{argmax}_n \Sigma_j B(n, j) (\Sigma B(n, j) > TB') \qquad (28)$$

$$n=1, \ldots, N$$

$$\Delta(m)=D(n', j_n(m)) \qquad (29)$$

where TB represents a threshold value of data amount for all the nodes in the same layer.

In a seventh process, the reference pattern generating device 8 calculates the leaf node mean vectors (leaf vectors) as follows using adaptation vectors produced in the above way, and updates the reference pattern stored in the reference pattern memory device 2 by using the leaf vectors thus obtained (i.e., produces an adapted reference pattern which is stored in the reference pattern memory device 2) (step 207).

$$\hat{\mu}_m = \mu_m + \Delta(m) \qquad (30)$$

Lastly, modifications of the embodiment of the pattern adaptation system using the tree scheme will be described. The present invention can be realized by modifying the construction and operation of the embodiment as shown below.

The pattern matching device 3 in the embodiment uses a Viterbi algorithm as a method of pattern matching. However, it is possible to instead use a method called a forward-backward algorithm. In this case, the numbers of data pieces are probability-based values, and real numbers are stored in the buffer B. Again, in this case, adaptation by a method like that described above is possible.

Again, in this case, the pattern matching device 3 executes probability-based matching, and the data amount estimating device 5 calculates an expected input sample number which is used in lieu of the input sample.

In another modification, Gaussian distribution mean vector difference vectors (i.e., adapted vectors based on the difference vectors) are used as the adaptation parameter. It is a further possible adaptation in a system like that described above using other adaptation parameters, such as Gaussian distribution mean vectors, coefficients of weighting in the distributed state, differentials of these parameters, etc. Yet further, it is possible to obtain adaptation of the above parameters simultaneously in combination.

In a further modification, the method described in the Takao Literature is used to organize the tree scheme concerning the tree scheme reference pattern. This tree scheme organization method, however, is by no means limitative. For example, it is possible to use vocal sound similarities in the vocal sound theory. Furthermore, it is possible to use a probability-based tree scheme, in which the degrees to which sub-nodes belong to parent nodes are shown by real numbers of 0 to 1 and the sum of degrees to which a sub-node belongs to a plurality of parent nodes is 1.

The Takao Literature describes recognition using tree scheme. When using the method shown in the Takao Literature as recognizing device, it is possible to obtain improvement of the recognition performance using a tree scheme by making the tree scheme that is used in recognition to be the same as the tree scheme used for the adaptation.

A still further modification uses a method, in which the reference pattern updating is made after operation concerning all the input speeches (i.e., input of the input speech) has been ended. However, it is readily possible to update a reference pattern by executing the process described above for every sound, i.e., every input of input speech (progressive adaptation).

As has been described in the foregoing, according to the present invention the hierarchical layer in the reference pattern tree scheme for the adaptation parameter (such as adaptation vectors) is determined according to the data amount (i.e., input sample number), thus preventing the parameter estimation accuracy deterioration in case of a lesser data amount and also permitting fine reference pattern updating (adapted reference pattern production) corresponding to the data amount. For example, when the present invention is applied to a speaker adaptation system in a speech recognition system, the accuracy of parameter estimation in HMM or the like is not deteriorated in case of a lesser speaker's speech amount (input speech data statistics), and it is possible to obtain adequate speaker adaptation effects.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A pattern adaptation system using a distribution tree scheme for adapting a reference pattern comprised a plurality of different categories based on an input pattern as an aggregate of input samples comprising:
   (a) input pattern generating means for generating the input pattern;
   (b) reference pattern memory means for storing the reference pattern:
   (c) pattern matching means for matching the categories of the reference pattern stored in the reference pattern memory means with input samples of the input pattern generated by the input pattern generating means;
   (d) distribution tree scheme reference pattern memory means for storing beforehand a distribution tree scheme reference pattern as a reference pattern expressed in a tree scheme;
   (e) data amount estimating means for calculating the input sample numbers, in each node of the tree scheme reference pattern stored in the tree scheme reference pattern memory means, by using the correspondence obtained through the pattern matching by the pattern matching means;
   (f) node selection means for selecting a node for the adaptation according to the calculated number of the input samples by the data amount estimating means;
   (g) adaptation parameter generating means for calculating an adaptation parameter in a node selected by the node selecting means; and
   (h) reference pattern generating means for producing an adapted reference pattern by using the adaptation parameter produced by the adaptation parameter generating means and updating the reference pattern.

2. The pattern adaptation system using a tree scheme according to claim 1, wherein the pattern matching means executes probability-based matching, and the data amount estimating means calculates an expected input sample number, the expected input sample number being used in lieu of the input sample number.

3. The pattern adaptation system using a tree scheme according to claim 1, wherein the input pattern used is a time series of feature vectors obtained through analysis of the input speech.

4. The pattern adaptation system using a tree scheme according to claim 3, wherein a hidden Marcov model, in which the output probability distribution is a mixture Gaussian distribution, is used as the tree scheme reference pattern.

5. The pattern adaptation system with a tree scheme according to claim 4, wherein the tree scheme reference pattern is a tree scheme reference pattern produced by taking considerations of output probability distribution mean vectors in individual stages of the hidden Marcov model.

6. The pattern adaptation system with a tree scheme according to claim 1, wherein the tree scheme is based on vocal sound similarities in the vocal sound theory.

7. The pattern adaptation system with a tree scheme according to claim 1, wherein the tree scheme is based on a probability-based tree scheme, in which the degrees to which sub-nodes belong to parent nodes are shown by real numbers of 0 to 1 and the sum of degrees to which a sub-node belongs to a plurality of parent nodes is 1.

8. The pattern adaptation system with a tree scheme according to claim 1, wherein the reference pattern is updated after operation concerning all input speeches has been ended.

9. The pattern adaptation system with a tree scheme according to claim 1, wherein the reference pattern is updated for every input of input speech.

10. The pattern adaptation system with a tree scheme according to claim 1,
    wherein the same tree scheme that is used for a speech recognition mode is used for the pattern adaptation system using a tree scheme.

11. A pattern adaptation system, using a distribution tree scheme for adapting a reference pattern comprising a plurality of different categories based on an input pattern as an aggregate of input samples, comprising the steps of:
    matching categories of a reference pattern and an input pattern,
    calculating a number of input samples in each node of a tree scheme reference pattern,
    selecting a node used for adaptation according to the input sample number calculated,
    producing an adaptation parameter in the node selected, and producing an adapted reference pattern and updating the initial reference pattern based on the produced adaptation parameter.

12. A pattern adaptation method utilizing a distribution tree scheme for adapting a reference pattern comprised of a plurality of different categories based upon an input pattern as an aggregate of input samples, comprising the steps of:

(a) generating an input pattern;

(b) storing a reference pattern in a reference pattern memory;

(c) matching the categories of the reference pattern to obtain a reference pattern match, the reference patterns stored in the reference pattern memory with input samples of the input pattern;

(d) storing beforehand a distribution tree scheme reference pattern, in a distribution tree scheme reference pattern memory, as a reference pattern expressed in a tree scheme;

(e) estimating a data amount by calculating the input sample numbers, in each node of the tree scheme reference pattern stored in the tree scheme reference pattern memory, by utilizing the correspondence obtained through the pattern matching;

(f) selecting a node for the adaptation, according to the calculated number of the input samples, by utilizing the results of step (e);

(g) generating an adaptation parameter for calculating an adaptation parameter in the node selected as a result of step (f); and (h) generating a reference pattern for producing an adapted reference pattern by using the adaptation parameter and updating the reference pattern.

13. A method for obtaining a speech probability comprising the steps of:

(a) calculating a first plurality of distribution probabilities, wherein the plurality of distribution probabilities correspond to a plurality of nodes comprising a distribution tree structure, (b) calculating a sum of the plurality of distribution probabilities, (c) calculating a vocal sound unit probability by utilizing the calculated sum, (d) calculating at least a word probability by utilizing the vocal sound unit probability, (e) calculating a speech probability by utilizing a set of results of steps (a) through (d), (f) adapting a reference pattern based upon an input pattern and the results of step (e), and (g) adapting an input pattern based upon the results of step (e).

14. A method as recited in claim 13 wherein the distribution tree structure comprises a hidden Marcov model, in which the output probability distribution is a mixture Gaussian distribution.

15. A method as recited in claim 14 wherein the distribution tree structure is produced by taking considerations of output probability distribution mean vectors in individual stages of the hidden Marcov model.

16. A method as recited in claim 13 wherein the distribution tree structure is based upon vocal sound similarities in the vocal sound theory.

17. A method as recited in claim 13 wherein the distribution tree structure is based upon a probability-based distribution tree scheme, in which the degrees to which a third plurality of sub-nodes belong to a fourth plurality of parent nodes are shown by real numbers of 0 to 1 and the sum of degrees to which a sub-node belongs to the fourth plurality of parent nodes is 1.

18. A pattern adaptation apparatus, utilizing a distribution tree scheme for adapting a reference pattern comprised of a plurality of different categories based upon an input pattern as an aggregate of input samples, comprising:

(a) an input pattern generating unit for generating the input pattern, wherein
the input pattern utilized comprises a time series of feature vectors obtained by an analysis of an input speech;

(b) a reference pattern memory unit for storing the reference pattern;

(c) a pattern matching unit for matching the categories of the reference pattern stored in the reference pattern memory unit with input samples of the input pattern generated by the input pattern generating unit, wherein the pattern matching unit executes a probability-based matching;

(d) a distribution tree scheme reference pattern memory unit for storing beforehand a distribution tree scheme reference pattern as a reference pattern expressed in a tree scheme;

(e) a data amount estimating unit for calculating the input sample numbers, in each node of the tree scheme reference pattern stored in the tree scheme reference pattern memory unit, by utilizing the correspondence obtained through the pattern matching by the pattern matching unit;

(f) a node selection unit for selecting a node for the adaptation according to the calculated number of the input samples by the data amount estimating unit, wherein
the tree scheme is based upon a probability-based tree scheme, and wherein the degrees to which sub-nodes belong to parent nodes are represented utilizing real numbers of 0 to 1, and a sum of degrees to which a sub-node belongs to a plurality of parent nodes is 1;

(g) an adaptation parameter generating unit for calculating an adaptation parameter in a node selected by the node selecting unit; and (h) a reference pattern generating unit for producing an adapted reference pattern by using the adaptation parameter produced by the adaptation parameter generating unit and updating the reference pattern.

19. A pattern adaptation apparatus as recited in claim 18, wherein
the data amount estimating unit calculates an expected input sample number, and wherein the expected input sample number is utilized instead of the input sample number.

20. A pattern adaptation apparatus as recited in claim 18, wherein
a hidden Marcov model, in which an output probability distribution is a mixture Gaussian distribution, is utilized as the reference pattern tree scheme, and wherein the tree scheme reference pattern is a tree scheme reference pattern produced by taking considerations of output probability distribution mean vectors in individual stages of the hidden Marcov model.

* * * * *